(No Model.)
A. C. LOBDELL.
LIGHTNING ROD.
No. 278,028. Patented May 22, 1883.
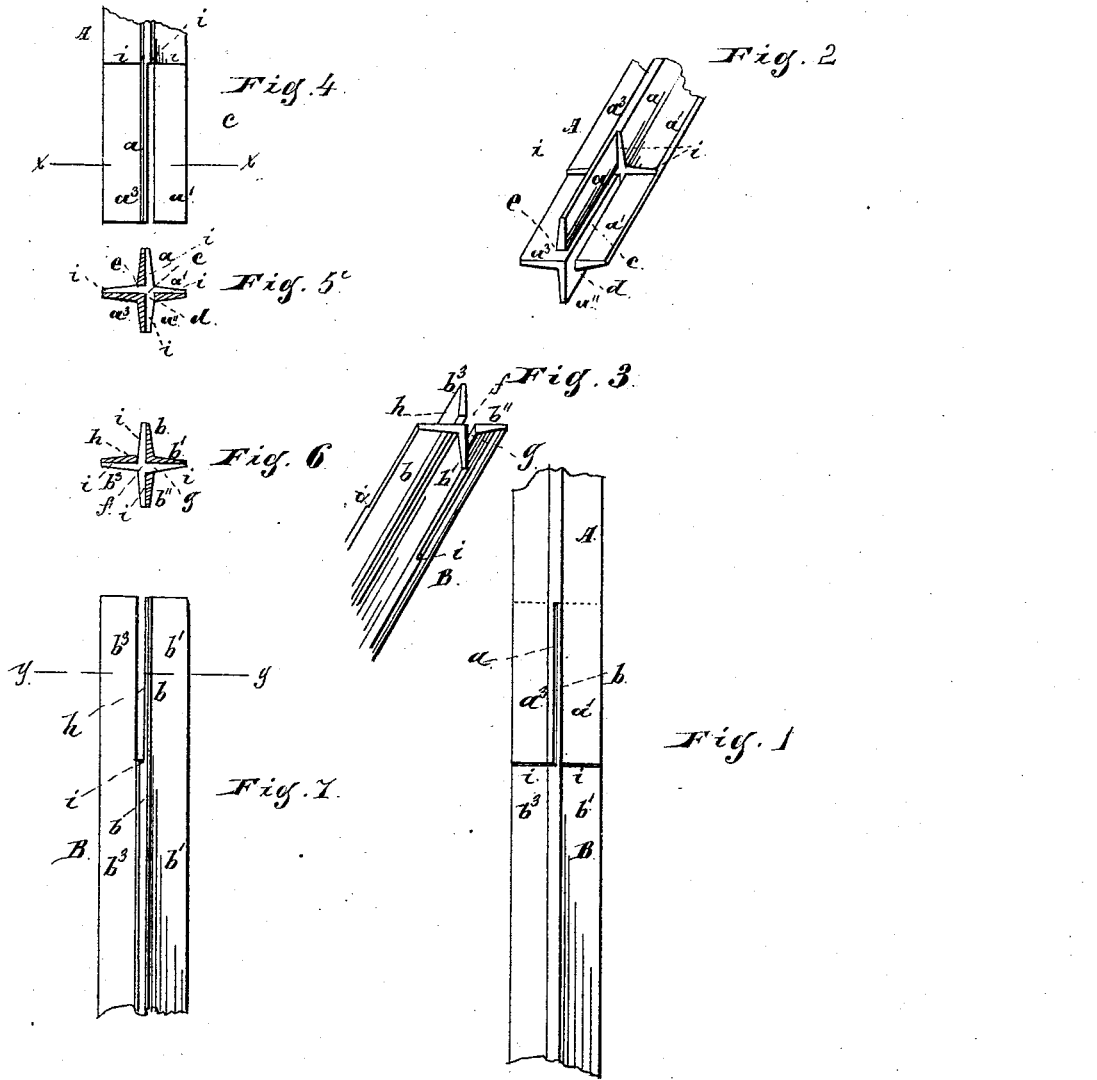
Witnesses:
Albert H. Adams.
Edgar T. Bond.
Inventor:
Augustus C. Lobdell
Augustus C. Lobdell

UNITED STATES PATENT OFFICE.

AUGUSTUS C. LOBDELL, OF CHICAGO, ILLINOIS.

LIGHTNING-ROD.

SPECIFICATION forming part of Letters Patent No. 278,028, dated May 22, 1883.

Application filed June 10, 1882. (No model.)

*To all whom it may concern:*

Be it known that I, AUGUSTUS C. LOBDELL, residing at Chicago, in the county of Cook and State of Illinois, and a citizen of the United States, have invented a new and useful Improvement in Lightning-Rods, of which the following is a full description, reference being had to the accompanying drawings, in which—

Figure 1 is an elevation, showing the ends of two sections of a lightning-rod joined; Figs. 2 and 3, perspective views, showing the form of cutting the ends of lightning-rod sections to produce the joint by which the ends are united; Fig. 4, a side elevation of the end of a lightning-rod section or strip; Fig. 5, a cross-section on line $x\ x$ of Fig. 4; Fig. 6, a cross-section on line $y\ y$ of Fig. 7; Fig. 7, a side elevation of the end of a lightning-rod section or strip to be joined to the end shown in Fig. 4.

This invention is primarily designed for connecting strips or sections of star iron or rod for use as a lightning-rod; but it can be used for connecting such iron or rod sections or strips for other purposes. By "star iron or rod" is meant that style or form having four flanges or wings joined at the center.

The object of the invention is to form a joint for the ends of the sections or strips by which the sections can be readily united or joined, so as to be firm and unyielding, and so that the ends will be self-sustaining, one to the other, without the use of rivets.

The invention consists, essentially, in the method of joining the ends of two flanged rods by cutting away the end of each rod to form longitudinal slots between two of the flanges and the other two, which are joined, reducing the thickness of each flange from the inner to the outer ends of the slots, to form shoulders across the width of the flanges at the inner ends of the slots, and then slipping the two united flanges of the respective rods into the slots until the ends of the flanges abut the said shoulders, whereby plane flush surfaces are provided at the joint.

The invention further consists in the combination of two flanged rods, each provided at one end with longitudinal slots, which separate two flanges from two united flanges, and each flange being reduced in thickness to form a shoulder across its width at the inner end of the slots, substantially as described.

In the drawings the ends only of two sections or strips of the iron or rod are shown, that being all that is required to show the invention.

A represents the end of one section or strip; B, the end of the section or strip which is to be joined to the section or strip A. The section or strip A, as shown, consists of four flanges or wings, $a$, $a'$, $a^2$, and $a^3$, the flanges or wings $a\ a^2$ being on opposite sides and in line with each other, and the flanges or wings $a'\ a^3$ standing at right angles to $a\ a^2$ on opposite sides and in line with each other. The section or strip B is also formed of four wings or flanges, $b$, $b'$, $b^2$, and $b^3$, corresponding in form and arrangement to the wings or flanges $a\ a'\ a^2\ a^3$. The end of the section A, at its center, is cut away the distance required for the length of lap, removing the center between the wings or flanges $a\ a'$, leaving a slot, $c$, and also dividing the wing or flange $a'$ from the wing or flange $a^2$, leaving a slot, $d$, dividing also the wing or flange $a$ from the wing or flange $a^3$, leaving a slot or opening, $e$, with the flanges $a^2\ a^3$ joined at the center, as shown in Figs. 2 and 5. The center of B is correspondingly cut away at the end the distance required for the lap, leaving an opening or slot, $f$, between the flanges $b^2\ b^3$, and slot or opening $g$ between the flanges $b'\ b^2$, and a slot or opening, $h$, between the flanges $b\ b^3$, with the flanges or wings $b\ b'$ united at the center. By this method of forming the slots in the ends of the respective sections A B it will be seen that the two united flanges $a^2\ a^3$ of the section A correspond, when the parts are in position to be slipped together, with the slots $f$, $g$, and $h$ in the section B, and that the united wings or flanges $b\ b'$, when the sections are in position to slip together, correspond with the slot $c$, $d$, and $e$ in the section A, so that the two ends can slip past each other the distance for the lap, the wings or flanges $a^2\ a^3$ slipping into the slots $g\ h$, respectively, and the wings or flanges $b\ b'$ slipping into the slots $d\ e$, respectively. As shown, in forming the slot $c$ half of the thickness of the flanges or wings $a\ a^2$ is cut away, and in forming the slot $e$ half of the thickness of the flanges or wings $a'$ $a^3$ is cut away; and the same is true in forming the slots $g$ and $h$, half of the thickness of the wings $b'$ $b^2$ being cut away for $g$, and half of the thickness of the flanges or wings $b$ $b^2$ being cut away for the slot $h$, and it will be noticed that the cut-away portion of the flanges $a$ $a^2$ and $a'$ $a^3$ are on opposite sides to the cut-away portion of the flanges $b$ $b^2$ and $b'$ $b^3$, so that in putting the parts together the cut-away portions of the wings or flanges $a$ $a^2$ lie against the cut-away portion of the flanges $b$ $b^2$, and the same is true of the flanges $a'$ $a^3$ and $b'$ $b^3$. By cutting away the flanges one-half their thickness, as just described, a shoulder, $i$, is formed at the end of each flange or wing, against which the end of the adjacent flange or wing abuts, thus forming a stop at each end to assist in preventing side play, and also bringing the respective flanges or wings in line, forming a plain, smooth, and even surface at the juncture, causing the flanges $a'$ $a^2$ $a^3$ to coincide evenly with the flanges $b$ $b'$ $b^2$ $b^3$, respectively. By cutting the ends of the respective flanges A B, as shown, it will be seen that the joined flanges or wings $a^2$ $a^3$ come outside of the divided flanges or wings $b^2$ $b^3$, forming a backing therefor, and that the same is true of the flanges $b$ $b'$, which come outside of the flanges $a$ $a'$, and that when the parts are slipped together the joined flanges $a^2$ $a^3$ and $b$ $b'$ come opposite each other, so that a very firm and solid joint is provided, and one which will not be liable to break readily, as one part strengthens and supports the other, notwithstanding the slot.

If desired, a ring or band of suitable material could be made to encompass the ends of the sections at the joint for the purpose of making the juncture stiffer and stronger.

For a tight joint the slots $d$ $e$ $g$ $h$ should correspond in width to the thickness of the flanges, producing a snug tight fit.

What I claim as new, and desire to secure by Letters Patent, is as follows:

1. The method herein described of joining the ends of flanged rods, which consists in cutting away the end of each rod to form longitudinal slots between two of the flanges and the other two, which are joined, reducing the thickness of each flange to form a shoulder across the width thereof at the inner end of the slots, and then slipping the two united flanges of the respective rods into the slots until the ends of the flanges abut said shoulders, substantially as described.

2. The combination of two flanged rods, each provided at one end with longitudinal slots, and each flange being reduced in thickness at its end portion to form a shoulder across its width at the inner ends of the slots, whereby the reduced portion of one may be placed against the reduced portion of the other to form a joint with the faces of the flanges flush with one another, substantially as described.

AUGUSTUS C. LOBDELL.

Witnesses:
ALBERT H. ADAMS,
EDGAR T. BOND.